(12) United States Patent
Claus et al.

(10) Patent No.: US 10,464,236 B2
(45) Date of Patent: Nov. 5, 2019

(54) DEVICE FOR HEATING PREFORM BODIES OR FLAT OR PREFORMED SEMI-FINISHED PRODUCTS FROM THERMOPLASTIC MATERIAL

(71) Applicant: watttron GmbH, Freital (DE)

(72) Inventors: Ronald Claus, Dresden (DE); Marcus Stein, Dresden (DE); Sascha Bach, Dresden (DE)

(73) Assignee: WATTTRON GMBH, Freital (DE)

( * ) Notice: Subject to any disclaimer, the term of this patent is extended or adjusted under 35 U.S.C. 154(b) by 398 days.

(21) Appl. No.: 14/902,452

(22) PCT Filed: Jun. 24, 2014

(86) PCT No.: PCT/EP2014/063293
§ 371 (c)(1),
(2) Date: Dec. 31, 2015

(87) PCT Pub. No.: WO2015/000748
PCT Pub. Date: Jan. 8, 2015

(65) Prior Publication Data
US 2016/0200003 A1    Jul. 14, 2016

(30) Foreign Application Priority Data

Jul. 3, 2013  (DE) .................. 10 2013 011 306
Feb. 7, 2014  (DE) .................. 10 2014 202 302

(51) Int. Cl.
*B29C 49/64*    (2006.01)
*B29C 49/12*    (2006.01)
(Continued)

(52) U.S. Cl.
CPC ............ *B29B 13/024* (2013.01); *B29C 49/12* (2013.01); *B29C 49/6418* (2013.01);
(Continued)

(58) Field of Classification Search
CPC ... B29B 13/024; B29C 49/12; B29C 49/6463; B29C 35/02; B29C 2035/0211;
(Continued)

(56) References Cited

U.S. PATENT DOCUMENTS 3,386,503 A    6/1968  Coming et al.
4,002,883 A *  1/1977  Hurko .................... H05B 3/748
                                                    219/466.1
(Continued)

FOREIGN PATENT DOCUMENTS

DE    19736462 A1    2/1999
DE    10020410 A1    10/2001
(Continued)

*Primary Examiner* — Anthony Calandra
*Assistant Examiner* — Jerzi H Moreno Hernandez
(74) *Attorney, Agent, or Firm* — Jacobson Holman, PLLC

(57) ABSTRACT

The invention relates to a device for heating preform bodies or flat or preformed semi-finished products from thermoplastic material (3), comprising at least one base body (1.0, 2.0), on the surface of which at least a first layer or coating is formed, which comprises at least one electric heating resistor in the form of a flat, geometrically arranged conductor loop. The base body also has contact elements, by which the at least one heating resistor can be connected to a power source, wherein, as a result of the geometrically arranged conductor loop(s), a defined temperature profile can be generated, which can be transmitted contactlessly to the preform body or the semi-finished product by an outer contact layer formed on the first layer or coating, by contact the surface of a preform body or semi-finished product and/or by using convection or thermal radiation. During a transmission of the defined temperature profile, the preform body or the semi-finished product is arranged at a distance to the contact layer(s).

10 Claims, 9 Drawing Sheets

Figure 1:
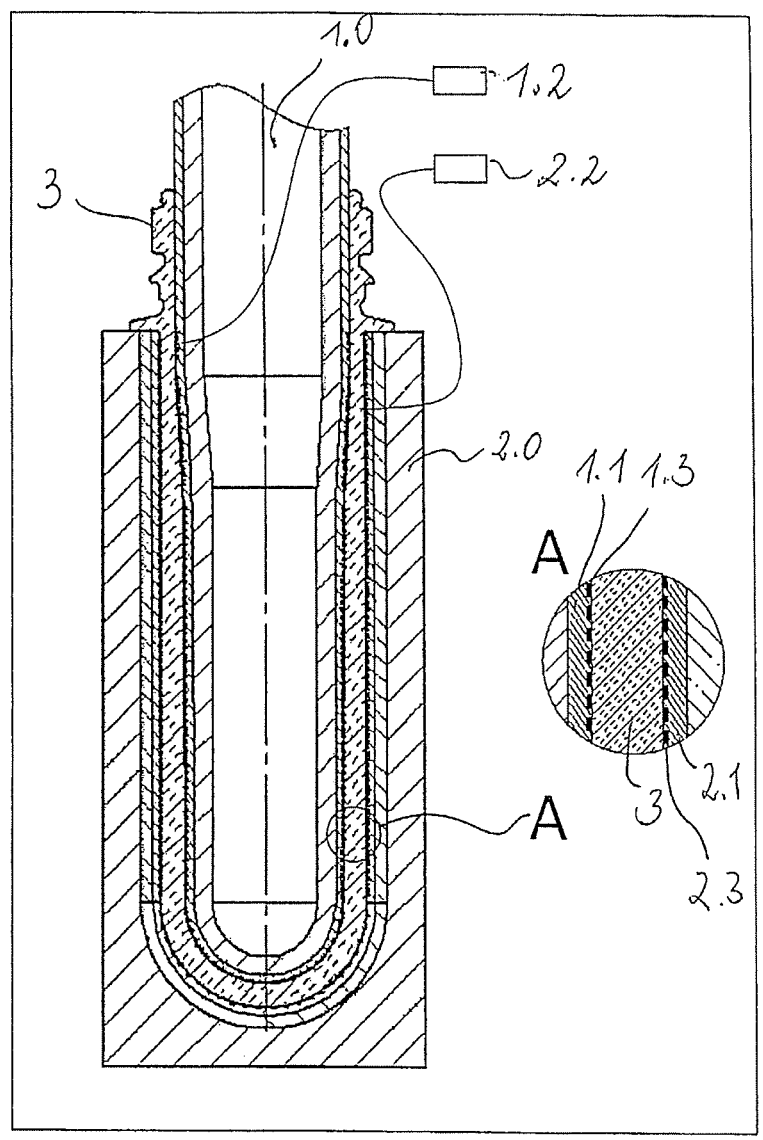

(51) Int. Cl.

| | |
|---|---|
| *B29B 13/02* | (2006.01) |
| *B29C 51/42* | (2006.01) |
| *H05B 3/14* | (2006.01) |
| *H05B 3/46* | (2006.01) |
| *B29K 105/00* | (2006.01) |
| *B29C 49/68* | (2006.01) |
| *B29C 35/08* | (2006.01) |
| *B29C 35/02* | (2006.01) |

(52) U.S. Cl.
CPC ...... B29C 49/6436 (2013.01); B29C 49/6445 (2013.01); B29C 49/6463 (2013.01); B29C 51/421 (2013.01); B29C 51/422 (2013.01); H05B 3/141 (2013.01); H05B 3/146 (2013.01); H05B 3/46 (2013.01); *B29C 35/02* (2013.01); *B29C 49/6409* (2013.01); *B29C 49/68* (2013.01); *B29C 2035/0211* (2013.01); *B29C 2035/0822* (2013.01); *B29C 2049/1247* (2013.01); *B29K 2105/256* (2013.01); *B29K 2105/258* (2013.01); *H05B 2203/013* (2013.01); *H05B 2203/025* (2013.01); *H05B 2203/037* (2013.01)

(58) Field of Classification Search
CPC ........ B29C 2035/0822; B29C 49/6445; B29C 49/6436; B29C 51/422; B29C 51/421; B29C 2049/1247; B29C 49/6418; B29C 49/68; B29C 49/6409; H05B 3/46; H05B 3/146; H05B 3/141; H05B 2203/013; H05B 2203/025; H05B 2203/037; B29K 2105/256; B29K 2105/258

See application file for complete search history.

(56) References Cited

U.S. PATENT DOCUMENTS

| | | | | |
|---|---|---|---|---|
| 4,044,086 A * | 8/1977 | McChesney | ........ | B29C 49/0073 264/327 |
| 4,204,111 A * | 5/1980 | Yonko | ........ | B29C 49/68 219/388 |
| 4,883,947 A * | 11/1989 | Murase | ........ | G01N 27/4067 219/553 |
| 5,177,341 A * | 1/1993 | Balderson | ........ | H05B 3/26 219/466.1 |
| 5,180,893 A * | 1/1993 | Sugiyama | ........ | B29C 33/02 219/633 |
| 5,434,387 A * | 7/1995 | Haley | ........ | B29B 13/024 156/296 |
| 5,824,237 A | 10/1998 | Stumpf et al. | | |
| 6,069,346 A | 5/2000 | Hyllberg | | |
| 6,485,668 B1 * | 11/2002 | Murphy | ........ | B29C 49/24 156/156 |
| 7,540,656 B1 * | 6/2009 | Stochl | ........ | G01N 25/18 374/29 |
| 8,454,340 B1 * | 6/2013 | Loveless | ........ | B29C 71/02 219/535 |
| 9,409,342 B2 | 8/2016 | Le Pechour et al. | | |
| 2001/0028930 A1 * | 10/2001 | Koch | ........ | B29C 45/73 428/35.7 |
| 2005/0030347 A1 * | 2/2005 | Zarev | ........ | B41J 2/1412 347/61 |
| 2005/0173404 A1 * | 8/2005 | Benjamin | ........ | H01L 21/67103 219/444.1 |
| 2005/0247393 A1 * | 11/2005 | Misani | ........ | B29C 35/0266 156/123 |
| 2005/0252906 A1 * | 11/2005 | Shaw | ........ | H05B 3/74 219/466.1 |
| 2005/0258165 A1 * | 11/2005 | Takei | ........ | H01L 21/67109 219/482 |
| 2006/0011610 A1 * | 1/2006 | Kondou | ........ | H05B 3/143 219/444.1 |
| 2006/0096251 A1 * | 5/2006 | Donges | ........ | B29C 51/42 53/453 |
| 2007/0114221 A1 * | 5/2007 | Shon | ........ | F24C 7/06 219/401 |
| 2007/0145039 A1 * | 6/2007 | Nevin | ........ | B29C 51/421 219/543 |
| 2010/0103623 A1 * | 4/2010 | Kwank | ........ | H01L 23/13 361/709 |
| 2011/0092072 A1 * | 4/2011 | Singh | ........ | C23C 14/541 438/710 |
| 2011/0101556 A1 * | 5/2011 | Bach | ........ | B29B 13/023 264/40.6 |
| 2011/0132892 A1 * | 6/2011 | Winzinger | ........ | B29B 13/024 219/420 |
| 2011/0175260 A1 | 7/2011 | Albrecht | | |
| 2012/0092724 A1 * | 4/2012 | Pettis | ........ | B29C 64/386 358/1.15 |
| 2012/0100238 A1 * | 4/2012 | Humele | ........ | B29C 49/28 425/90 |
| 2012/0269918 A1 * | 10/2012 | Winzinger | ........ | B29B 13/024 425/174.4 |
| 2013/0189385 A1 * | 7/2013 | Zoppas | ........ | B29B 13/024 425/3 |
| 2014/0377394 A1 * | 12/2014 | Le Pechour | ........ | B29C 49/4823 425/144 |

FOREIGN PATENT DOCUMENTS

| | | |
|---|---|---|
| DE | 10106607 A1 | 9/2002 |
| DE | 102008062199 A1 | 12/2009 |
| DE | 102010001096 A1 | 7/2011 |
| DE | 102010048211 A1 | 4/2012 |
| EP | 0713755 A2 | 5/1996 |
| EP | 0970798 A1 | 1/2000 |
| EP | 1509384 B1 | 12/2005 |
| EP | 2269793 A1 | 1/2011 |
| EP | 2447038 A2 | 5/2012 |
| GB | 2322272 A | 8/1998 |
| JP | 2011520672 A | 7/2011 |
| WO | WO2012049635 A1 | 4/2012 |
| WO | WO2013093335 A1 | 6/2013 |

\* cited by examiner

DEVICE FOR HEATING PREFORM BODIES OR FLAT OR PREFORMED SEMI-FINISHED PRODUCTS FROM THERMOPLASTIC MATERIAL

The invention relates to an apparatus for heating molds or planar or preformed semi-finished products composed of thermoplastic resin, in particular preforms for use in blow forming or for forming (thermoforming).

The stretch blow molding process is widely used for manufacturing moldings of thermoplastic resins or glass. Containers, primarily bottles, of the most varied shapes and sizes are in particular manufactured using this method in the beverage industry. In this respect, preforms manufactured by injection molding are processed which have a completely formed head region (bottle opening) and a body to be formed in the stretch blow molding process. The body is first brought into a formable state by heating and is subsequently mechanically stretched over a stretching bar before it is expanded by means of excess pressure or a vacuum. Locally different degrees of stretching occur in the stretching of the plastic which takes place in this process in accordance with the molding process and due to the end form to be reached, which results in an inhomogeneous wall thickness distribution. Properties such as mechanical load on or a barrier effect of mold products or containers manufactured in this manner are thereby locally influenced in a critical manner. Attempts are therefore made using different processes to improve the stretching procedure such that wall thickness distributions can be achieved which are as advantageous (usually homogeneous) as possible. However, this can only be realized to a limited degree with known processes. There are furthermore technical barriers to the known processes, in particular with respect to material saving (so-called lightweighting) or in the production of non-rotationally symmetrical blow mold products, which require new technical solutions.

One approach to solving the named problems can be seen in the use of heating systems for preheating the preforms. The heating or heating-up of the preforms is generally achieved by means of infrared radiation. In this respect, the radiators used are arranged in rows to form a linear heating path in continuously operating plants. The preforms, which are preferably fixed at the head region, in this respect move in a rotating manner through the heating tunnel, whereby they are evenly heated at the periphery. An energy input in this respect only takes place from the outer side of the preforms. To avoid an overheating of the surface, air is introduced into the heating tunnel for cooling and the preforms are flowed around thereby. This additionally required surface cooling and the small energetic efficiency of the radiant heater (of approximately 30%) are the reasons for the small overall efficiency of the described heating process. A correspondingly long heating time, which together with the predefined application defines the minimum length of the heating path, is therefore required for a sufficiently homogeneous temperature profile reaching into the depth of a preform. Large installation surfaces are thereby particularly necessary for the heating device in high-performance machines.

Previously, the primary goal of inventions in the region of the heating of preforms was, such as in DE 100 20 410 64, to generate temperature profiles which are as homogeneous as possible in the total preform; recently, different possibilities have been described to input defined inhomogeneous temperature profiles into the preform. The use of such an inhomogeneous heating lies in the direct influencing of the stretching behavior due to the highly temperature-dependent mechanical material properties of the preforms. The deformation resistance of the material can be directly weakened locally by a zonal temperature increase, which has the consequence of a particularly strong stretching at the start of the molding process and a small wall thickness at the end of the molding process. An opposite behavior can be realized when thin points occur, for example in the corner regions of the mold, due to a smaller heating which produces a "thickening" of these regions.

A heating device is known from patent specification DE 197 36 462 C2 which uses radiation of different intensities distributed over the length of the body for the introduction of defined temperature profiles or temperature fields. This produces an inhomogeneous heating of the preform. It is disadvantageous in this respect that the heating zones or heating regions can only be roughly defined. The maximum possible temperature gradients are also limited at the transitions, whereby preforms of smaller sizes and small contours of the mold product such as corners cannot be directly influenced. An inhomogeneous heating in the radial direction is furthermore not possible with this method.

A further method is described in DE 10 2010 048 211 A1. It is proposed therein to follow the homogeneous heating process with a local cooling process. Grippers, at whose inner sides cooling surfaces are formed, embrace the preform and thus produce a local cooling. In this respect, the additional process step required for this and the thus increased plant complexity as well as the further deterioration of the energetic efficiency have a negative effect. In addition, surface damage to the preform during gripping can only be avoided with a very complex movement control.

A further method for the production of a zonally different temperature distribution is described in DE 101 06 607 A1. It is proposed to use a laser system therein. Very small regions can also be set to a higher or lower temperature by the introduction of different radiation doses. In addition to the very high investment costs for a radiation source and mirror guidance system, the introduction of energy, which is only possible with restrictions, for ensuring the optical properties also proves to be disadvantageous in this variant. The regulation for the exact temperature setting can additionally only be realized with a high technical regulation effort. Comparatively long heating times, which cause long cycle times and thus small working speeds, are necessary due to the spot-like introduction of the energy and the three-dimensional geometry of the preform.

In addition to the contactlessly working processes, there are also approaches for a heat transfer involving contact. However, they only relate to the manufacturing process of plastic parts in an injection molding process. EP 0 713 755 B1 thus describes an apparatus for manufacturing plastic parts by means of a temperature-adjustable mold. It has an inwardly disposed layer which can be homogeneously heated and can be evenly cooled after introduction of the plastic.

EP 2 269 793 A1 pursues a similar approach. This technical solution is likewise directed to a uniform temperature adjustment of a cavity, with it preferably being used for manufacturing optical lenses or plastic parts in an injection molding process. In this respect, the heating layer is formed as a homogeneous planar coating and is fed with electrical energy via contact elements.

A method variant of a direct linking of the up ream manufacturing process of the preform by injection molding using the stretch blow molding process is disclosed in DE 10 2010 001 096 A1. In this respect, a casting mold is arranged coaxially above the blowing mold and is filled with liquid plastic at the start. The preform created in this manner is blow molded by opening the mold and transferring it into the blow mold directly subsequent to the original molding. The total casting mold is temperature adjusted in accordance with the desired temperature profile of the preform for the original molding process. The substantial thermal mass of the casting mold, which counteracts a fast cooling of a plastic compound and a locally resolved temperature adjustment of the preform, has a negative effect in this respect.

Starting from the prior art, it is therefore the object of the invention to provide an improved apparatus with which an efficient and defined heating of a preform body or semi-finished product can be achieved.

The object is achieved in accordance with the invention by an apparatus having the features of claim 1. Further embodiments of the apparatus in accordance with the invention can be realized using features designated in subordinate claims.

The apparatus in accordance with the invention for heating preform bodies or planar or preformed semi-finished products composed of thermoplastic resin has at least one body on whose surface at least one first layer or coating is formed which has at least one electrical heating resistor in the form of a conductor loop arranged in a planar geometry. The body furthermore has contact elements via which the at least one heating resistor can be connected to a power source, wherein a defined temperature profile can be generated as a result of the geometrically arranged conductor loop, said temperature profile being able to be transferred via an outer contact layer formed on the first layer or coating by contact with the surface of a perform body onto the perform body. There is the possibility in this respect to achieve the transfer of a defined temperature profile to the preform body, solely or additionally, in a contactless manner by using convection and/or thermal radiation. In this case, the preform body is arranged at a spacing from the contact layer(s). In this respect, a plurality of heating resistors are always at least present in planar semi-finished products when a heating of a semi-finished product is to be achieved with a touching contact.

The core of the present invention can be found in an apparatus which is configured as a contact heater, wherein a temperature profile generated on a body can be transferred to the corresponding preform body or to a semi-finished product by contact heating in an alternative in accordance with the invention. A semi-finished product can in this respect be a corresponding film or plate or an already preformed element of a thermoplastic resin which can be formed using at least one forming tool after the locally specific heating by means of the apparatus in accordance with the invention.

On a heating with a transfer of a defined temperature profile, a spatial resolution can be achieved by a corresponding arrangement, configuration and dimensioning of one or more conductor loops which is increased in comparison with conventionally used infrared radiators or halogen lamps, without additional optical elements, in that a small spacing from conductive regions of conductor loops has been observed with which a heating of contact layers can be achieved.

A preferably defined temperature profile is achieved in that an electric current which can be regulated or an electric voltage which can be regulated is applied to the contact elements as a result of which the at least one conductor loop of the heating resistor extending in a predefined and planar manner over the surface of the body is heated and a locally differentiated heating can preferably be achieved. A temperature profile should in this respect be defined while taking account of the geometrical design, of the dimensioning and/or of the locally different requirements for the forming of a respective preform body.

The body and/or at least the outer contact surface can in this respect be configured such that they correspond to at least one partial region of the surface of the perform body or semi-finished product, preferably to an inner surface of the perform body or semi-finished product. The body should preferably be formed from a temperature-stable material, preferably from a ceramic material or glass. Embodiments are, however, also possible in which the body is formed from metal or from a thermostable polymer. A body can be formed from LTCC ceramic material or HTCC ceramic material among other ceramic materials. Electrically conductive connections can advantageously be formed by means of vias through the ceramic material.

The use of the apparatus in accordance with the invention produces improvements in process stability and product quality as a result of an improved reproducibility of the temperature profile. Further advantages of the apparatus in accordance with the invention can be found in an increase in the application range of the stretch blow molding process by a locally high-resolution temperature profile along the conductor loop of the heating resistor as well as in an increased efficiency by reduction of the required heating energy, heating time and the reduced cycle time associated therewith.

On a use of bodies at which a plurality of individually controllable heating resistors are present, an easy adaptation to changed perform bodies or other products can be achieved as regards their geometry and the dimensioning in that a correspondingly adapted control of the individual heating resistors is carried out in which only the temperature profile required for this purpose is set. An adaptation can also be achieved by a modular design. In this respect, at least one body can be formed from a plurality of mutually connectable individual modules, with at least one respective heating resistor being present on each of the individual modules. Depending on the type, size, shape and number of the individual modules, an adapted body can be provided for the manufacture of a specific product. Individual modules can, however, equally also be of different designs.

A respective arrangement of heating resistors in which the heating resistors are each of the same design and are arranged at the same respective spacing from one another can then be selected both with a single body as a monolith and in individual modules. An adaptation to the specific temperature profile for a product can in this respect solely be reached by the control of the individual heating resistors.

Independently of the outer appearance of the apparatus, which can preferably be predefined by the body, the apparatus can comprise at least one multi-layer composite formed or applied to the body. In this respect, the conductor loop of the heating resistor introduced or applied in the first layer can be formed from a doped ceramic material or polymeric material which is applied to an electrically insulted carrier. One or more electric conductor loops for heating resistors can also be formed from a metal oxide layer or from an electrically conductive oxide layer. Electrical heating resistors should preferably have a thickness in the range 1 µm to 100 µm and a width in the range 0.01 mm to 5 mm.

In addition, the carrier can also be thermally insulated on the side facing the body. The conductor loop is therefore arranged in a structured, planar geometrical manner to form the defined temperature profile. Defined temperature zones can result, for example, by a defined path-like, meandering and/or spiral arrangement of the conductor loop on the surface of the body.

The at least one heating resistor or a plurality of heating resistors can in particular be arranged, configured and/or operable on a transfer of a desired temperature profile by utilizing convection and/or thermal radiation such that a defined temperature profile having a locally differentiated temperature distribution is transferred onto the preform body or onto a semi-finished product as a result of convection and/or thermal radiation. At least one conductor loop can thus accordingly be guided or formed on a surface of a body such that a heating of the contact layer takes place in certain regions. Other regions are not heated or are heated less in this respect so that, starting from there, regions of a preform body or of a semi-finished product are not heated or are heated to a lower temperature than in regions in which a conductor loop having a larger surface or a conductor loop formed e.g. as meandering is formed and in which smaller distances between regions of a conductor loop formed/arranged next to one another are observed. A locally differentiated heating can also be achieved, for example, if a conductor loop is used having different cross-sectional surface for the electrical conducting and/or due to different material consistency which results in locally different electrical resistances. There is in particular the possibility with a plurality of conductor loops to control them individually so that one or more conductor loops arranged accordingly with respect to a preform body are operated with a different electrical energy or power, whereby regions of a preform body or semi-finished product can also thereby be heated to different temperatures.

The desired defined temperature profile can be observed and transferred by a temperature at contact layers which can be set in a locally defined manner, which can in particular be achieved by a locally differentiated control or regulation of the electrical energy supplied to the conductor loops. The intensity of the emitted thermal radiation or the temperatures which can be transferred by thermal conduction changes in a locally differentiated manner by the respective energy input.

To increase the efficiency in a heating while utilizing thermal radiation, a suitable material or material mixture can be selected for the contact layers. Contact layers can also be coated with a corresponding material. With a material mixture, suitable chemical elements or chemical compounds can be contained in a matrix or can be embedded therein. The selection should take place in this respect such that, with an electrical voltage applied to conductor loops, a heating of the contact layers, optionally with the coating thereon, and thus an emission of thermal radiation results. The thermal radiation is in this respect in a wavelength range at which it is absorbed by the material of the preform body by at least 50%, preferably by at least 70%, and particularly preferably by at least 80%, and very particularly preferably by at least 90%.

On a heating using convection and/or thermal radiation, a preform body can also be moved through between elements provided with contact layers. A tunnel can so-to-say be formed using the elements, through which tunnel the preform body can be moved translatorily on the transfer of a temperature profile. In this respect, preform bodies can also rotate about an axis which is preferably aligned perpendicular to the translatory direction of movement. A preform body can, however, also be moved into an apparatus to achieve a transfer of a temperature profile. A locally differentiated heating solely at the outer surface can take place in this respect. There is, however, also the possibility, additionally or solely, to heat the inner surface of a preform body in that a body in the form of an arbor is introduced through an opening into the interior of the preform body.

It is furthermore possible that the conductor loop of the electrical heating resistor is applied directly, for example as an imprint on the surface of the body. It is particularly advantageous in this case if the body is formed from an electrically insulating material so that the conductor loops printed thereon are not electrically influencing each other.

There is the possibility to form defined temperature profiles or heating zones using only one conductor loop of a heating resistor (temperature fields through a non-constant cross-sectional surface of the body or by a specific geometrical arrangement of the conductor loop) or by a combination of a plurality of conductor loops (a plurality of heating resistors). Individual conductor loops can be separately contacted and can thus have electric current applied independently of one another. The preform or a semi-finished product can be heated specifically inhomogeneously in accordance with a temperature profile or heating layout to be defined beforehand. In the event that a plurality of conductor loops of a plurality of heating resistors are used, the body can have a corresponding number of contact elements via which the individual conductor loops of the heating resistors can be connected to a power source, which can be regulated, independently of one another.

In an embodiment of the apparatus in accordance with the invention, the at least one conductor loop of the heating resistor can be embedded in a matrix. In this respect, the upper contact layer can, for example, be formed from a glass material, ceramic material or polymeric material, wherein the outer contact layer should have properties such as wear resistance, low adhesion, good thermal transfer, and preferably resilience for adapting to the preform body surface of semi-finished body surface or should allow a compensation of thickness fluctuations of the semi-finished products or preform bodies used.

The multilayer structure applied to or formed on the body composed of a first layer and a contact layer can include even further functional modules or layers. The body can thus have a further, second layer which is formed between the first layer and the contact layer and in which passages and ports are formed for conducting fluid (gases or liquids), in particular for conducting coolant. Peltier elements which are arranged within one of the layers or in a separate layer can also be used for a direct leading in and/or out of heat. Such Peltier elements can then also be supplied with electrical power via the contact elements of the body.

Furthermore, sensors for the detection of the temperature and/or the contact pressure can be provided in at least one of the layers or coatings formed on the surface of the body and/or in a further third layer. The introduction of such a layer e.g. allows the independent detection and thus regulation of the temperatures of the electrical conductor loop(s) of the heating resistor(s). The electrical resistance can also be determined at the heating resistor(s) for the temperature determination since it changes in dependence on the temperature.

Advantageous additional functions can also be achieved with further layers such as insulating layers, top layers and protective layers and reflective layers.

In a further advantageous embodiment of the apparatus in accordance with the invention, the body and all the layers or coatings applied to or formed on it have a porosity and/or have passages through which an air flow can be implemented for generating a vacuum or excess pressure. The contact condition during the heating-up process can be improved and the heat transfer optimized using a vacuum. In contrast, the use of excess pressure, for example, after the end of the preheating, is advantageous to ensure a release which is as good as possible without damaging the surface of the preform or semi-finished product if a transfer of a temperature profile should preferably be achieved by contact heating. A locally differentiated cooling can also be achieved using a fluid flow, in particular an air flow. Surface regions of a preform body or of a semi-finished product which are, for example, irradiated or under the influence of convection can thus reach a greatly elevated temperature. Due to the small thermal conductivity of the preform body material or semi-finished product material, a high temperature gradient is therefore formed which can result in a disadvantageous influencing of the preform body material or semi-finished product material. This effect can be countered by corresponding cooling. A fluid flow can, however, also be used for a cleaning, sterilization or modification at surfaces of preform bodies or semi-finished products.

In a further advantageous embodiment, the apparatus has a further body of a prescribed configuration, wherein the further body and/or at least the outer contact surface of the further body can be designed and contoured geometrically in a manner complementary to the first body and/or at least to the outer contact surface of the first body and corresponds with at least a partial region of the surface of a preform body, preferably with an outer surface of the respective perform body, and can be contacted by it. In this embodiment, the first body can be formed as an arbor which introduces heat via the inner contour of the preform, wherein the further body can be formed as a bushing via which the heating of the outer surface(s) of the preform takes place. The preform is accordingly subjected to the heating process in that it is surrounded by the bushing and the arbor and can thus be heated by two oppositely disposed surfaces. In this respect, the electrical conductor loops of the heating resistors should also be correspondingly arranged and configured.

In addition to the proposed complete heating-up of the preform to the forming temperature and to the forming temperature profile, the contact heating and/or the heating while using convection and/or thermal irradiation can also be carried out as an intermediate process step. In this respect, a preform previously temperature adjusted to a base level is first heated by the contact, by convection and/or by means of thermal irradiation which is emitted, starting from contact layers or surfaces of contact layers, and is thereby heated to the final temperature profile.

It can be advantageous for a further embodiment if the multilayer composite, which at least comprises the first contact layer and the outer contact layer, is formed on a planar surface on which the outer contour of the preform is rolled of in the heating process This inter alia represents a further advantageous variant for the subsequent application of a temperature profile into a preform previously heated to a basic level.

A direct combination with a further conventional heating source for the hybrid heating up of a preform can also be an advantageous embodiment. An outer introduction of radiant energy using known infrared radiators/quartz radiators and in inner heating by the first body formed as an arbor is thus also conceivable, for example. It is thus possible with respect to the sole use of infrared radiators to considerably reduce the heating-up time by the additional heating from the inside.

A full-area contact of the body or of the outer contact surface with the preform surface or semi-finished product surface is of decisive importance for an optimum heating of a surface by means of contact heating. The bodies of the apparatus in accordance with the invention can have an integrated functionality of a tolerance compensation for this reason. A variant comprises the segmentation of the surface of the body or of the outer contact surface of the body to bring it into contact over the full area with the surface of the preform or semi-finished product in a force-locked manner. This can be implemented, for example, using a mechanical spring element (spring bearing), a pneumatic buffer (air cushion) or a hydraulic buffer. The surface can thereby adapt to the actual outer contour of the preform when pressed on. It is furthermore advantageous if the outer contact layer is of a flexible design and allows a tolerance compensation by elastic deformation. Corresponding elastic polymers can be used for this purpose.

A similar behavior can also be realized by the use of electrically conductive and stretchable polymer materials as the heating resistor material or conductor loop material. The heating layer (first layer) which is thereby likewise stretchable can adapt to the surface of the preform or semi-finished product by an external application of force. The surface to be heated can also be expanded by an applied pressure load and pressed onto the preform body surface due to the deformable multilayer composite.

With an apparatus in accordance with the invention preforms and semi-finished products can preferably be heated which are formed from a thermoplastic resin and which are supplied to a stretch blow molding process or blow forming process after the heating process. However, preforms and semi-finished products can also be heated which are formed from glass, metal, fiber-based material and composites thereof.

When the invention is used, there is the possibility of dispensing with a rotation on the heating of preform bodies and nevertheless to achieve a heating which is sufficient over the total required surface or in corresponding volume regions of the respective preform body. The technical apparatus effort is thereby reduced and no susceptible rotary drive is required.

Non-rotationally symmetrical preform bodies can advantageously also be heated in the desired defined form without temperature differences from the desired temperature profile occurring, which is not possible or is only insufficiently possible with conventional technical solutions.

Figure 7:
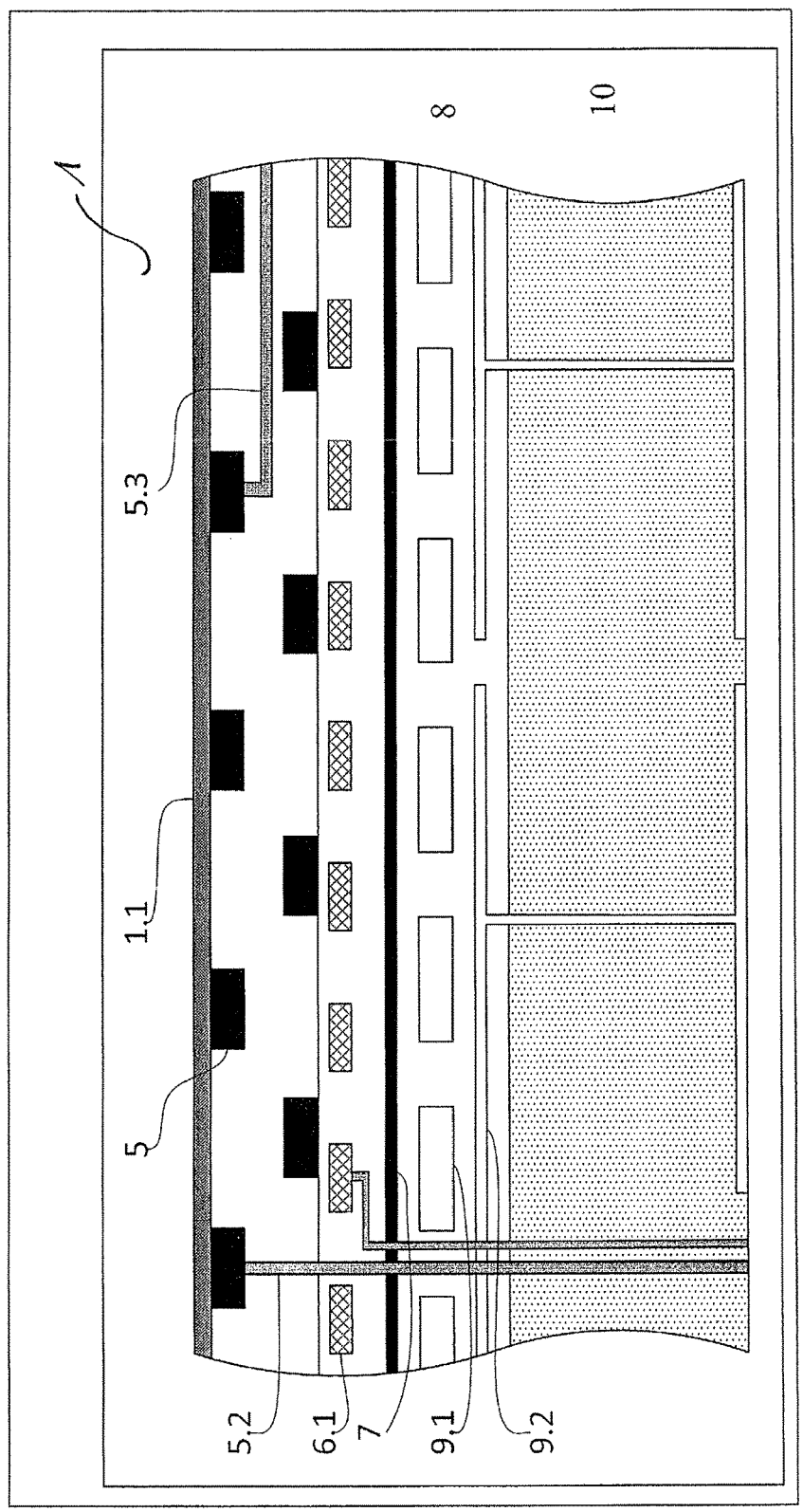

Multidimensional ceramic heating systems which can be manufactured using printing methods can be used for the heating-up (locally differentiated heating) of preform bodies or semi-finished products composed of thermoplastic resin in the invention. For this purpose, thin heating conductors in the form of thin layers are printed onto a ceramic or insulated metallic plate. The heating resistors are characterized by fine linear or meandering electrical conductor tracks which are a few micrometers thick and tenths of a millimeter wide. The heat input can here be controlled or also regulated locally specifically by the almost free design capability of the heating performance on the surface (heating pattern). There is the possibility of implementing and separately controlling a heating circuit or different heating circuits which are formed with respectively one or more heating resistors. It is accordingly possible to design heating resistors or heating circuits as pixels and to arrange them in the form of a matrix. The design as a multilayer heating system furthermore allows a vertical stacking of heating resistors and functional layers (having sensors, insulation regions or heat conducting regions, Peltier elements, etc.), whereby a high degree of flexibilization can be achieved. A possible design is shown in FIG. 7.

The energy transfer can in this respect take place both in contact between the contact surface and the semi-finished product and via radiation or convection. The temperature-dependent resistance of the heating resistors can equally be used for the temperature detection and regulation, like the use of temperature sensors which can be realized in further functional planes. A highly dynamic temperature regulation is possible as a result of the comparatively small cross-section of the heating resistors and of the thermal decoupling of the bodies. There is furthermore the possibility of operating the heating resistors as a pulse heating. On the control of the individual heating resistors, the temperatures aimed for of the adjacent heating resistors can be taken into account.

The electric control can inter alia take place in an analog manner, such as pulse-regulated. In this respect, each heating resistor or each heating circuit can be supplied by a separate power pack and or regulator individually or can also be influenced group-wise in combination by a power pack or regulator. It is conceivable in this respect to supply every single heating resistor or heating circuit only with a short energy pulse by a highly dynamic relaying of the line between the hearing resistors or heating circuits and thus to achieve a minimization of the performance electronics.

A high degree of format flexibility can be achieved by the arrangement of different heating resistors in different levels.

It is possible by the use of the partial heating-up/heating of the plastic to influence the wall thickness distribution in the forming and to dispense with the use of stretch rods in the thermoforming while obtaining a uniform wall thickness distribution. The wall thickness distribution can be controlled solely by the temperature distribution over the heating regions. The energy efficiency of the preheating process can furthermore be improved by the specific energy conduction.

In comparison with the partial heating-up methods implemented with radiator heaters, the absorption capability of a thermoplastic semi-finished product has no influence on its heating. On the utilization of heat contact heaters, the heat conductivity in the semi-finished product has a decisive influence on the heating-up behavior, whereby e.g. high temperature gradients can be achieved, whereby in turn the implementation of extremely defined temperature fields is promoted.

The implementation of a multilayer design allows a high degree of functional integration. High-resolution sensors can thus e.g. be placed directly at the active point or high temperature gradients can also be achieved by thermal conductive levels or insulation levels.

The form of a "matrix heater" in accordance with the invention allows a high degree of format flexibility. This decisively contributes to the flexibilization of preheating stations in plastic processing plants and thus to the minimization of equipping times. Furthermore, quality fluctuations can be responded to actively by a local adaptation of the temperature profile by an inline detection of quality features of the mold product and by a return into the machine control.

The use of temperature sensors for the control can be dispensed with by the utilization of the temperature dependence of the electrical resistance of the heating resistors as an indicator for the heating temperature. The energy input can thus be directly detected and controlled.

In the design of the heating resistors, the position and dimensioning of the electrical conductor tracks can be projected such that the respective heating performance can be reached at the desired positions. An apparatus in accordance with the invention has a small thermal capacity due to the small size and due to the thermal decoupling of the carrier components. A highly efficient and highly dynamic temperature management is thus possible on the heating up of preform bodies and semi-finished products.

The apparatus in accordance with the invention will be explained in more detail in the following with reference to figures and embodiments. Individual technical features or embodiments of the different examples can be combined with one another in this respect. It is accordingly possible to combine the transfer of temperature profiles to a preform body or to semi-finished products by contact heating with a locally differentiated heating while using convection and/or thermal radiation. In this respect, surface regions can be heated by contact heating and other surface regions of a preform body or semi-finished product can be heated by convection and/or thermal radiation.

Figure 2:
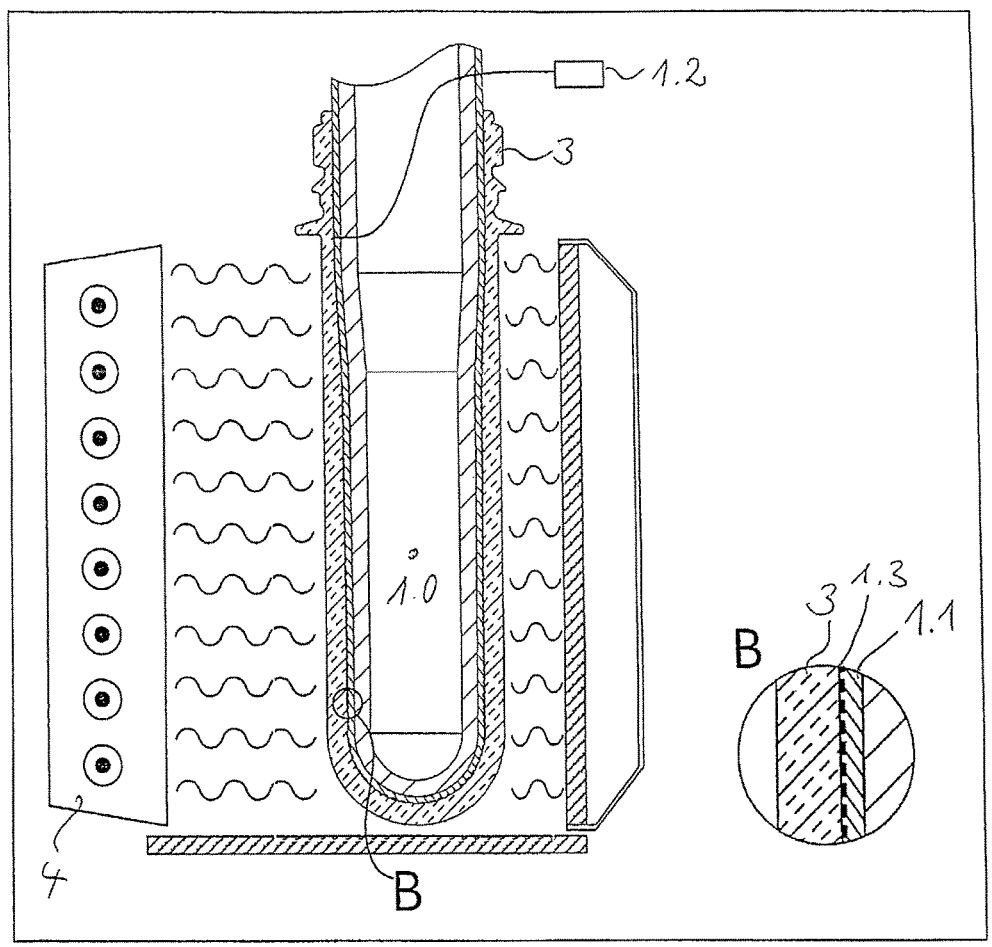
Figure 3:
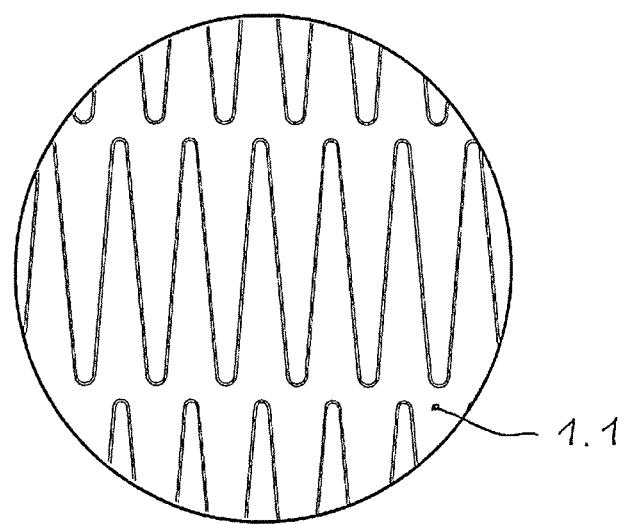

There are shown:

FIG. 1: a sectional representation of an example of the apparatus in accordance with the invention with coaxial bodies;

FIG. 2: a sectional representation of a further example of the apparatus in accordance with the invention with a body;

FIG. 3: a schematic representation of an example of a plurality of conductor loops of a plurality of heating resistors arranged in a geometrically planar manner.

Figure 4:
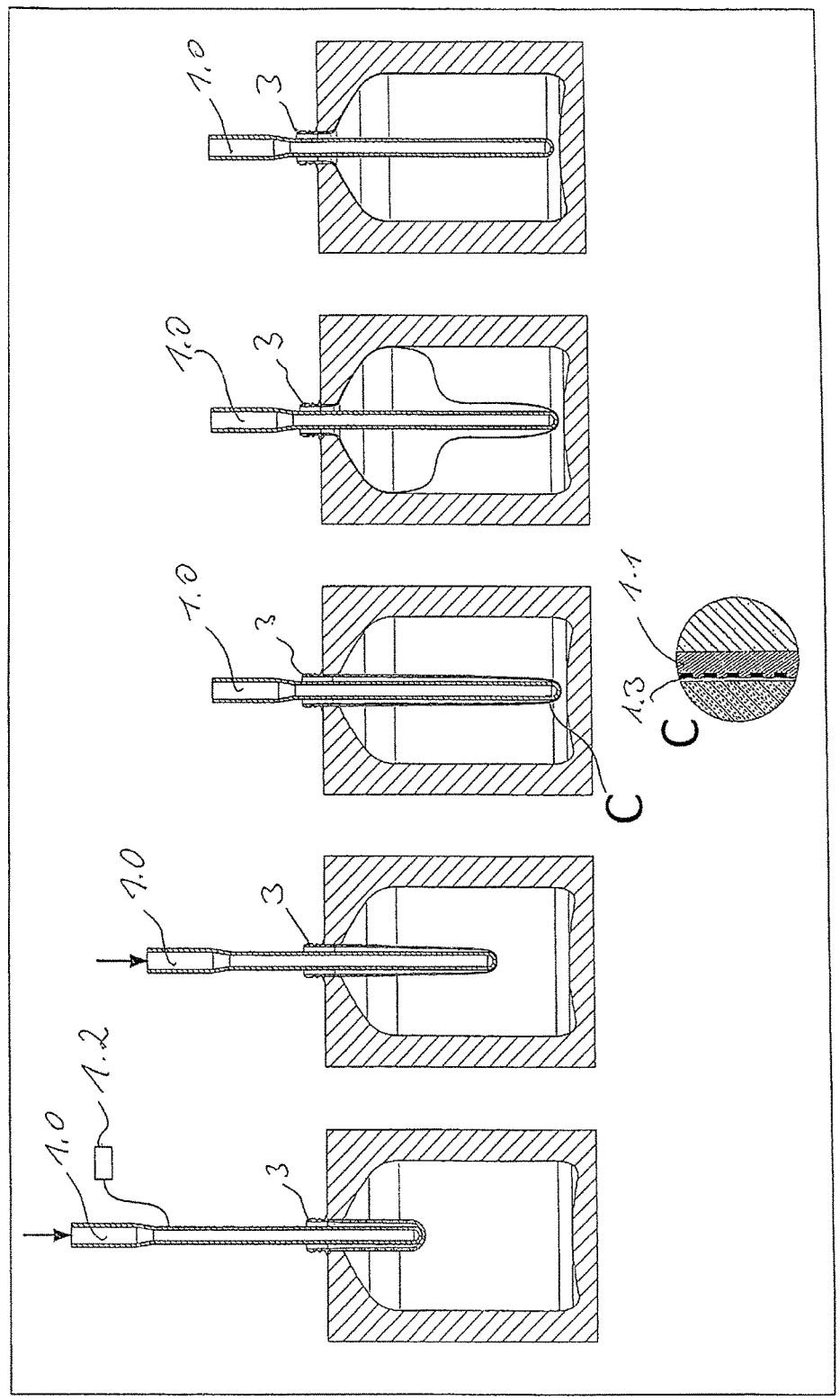
Figure 5:
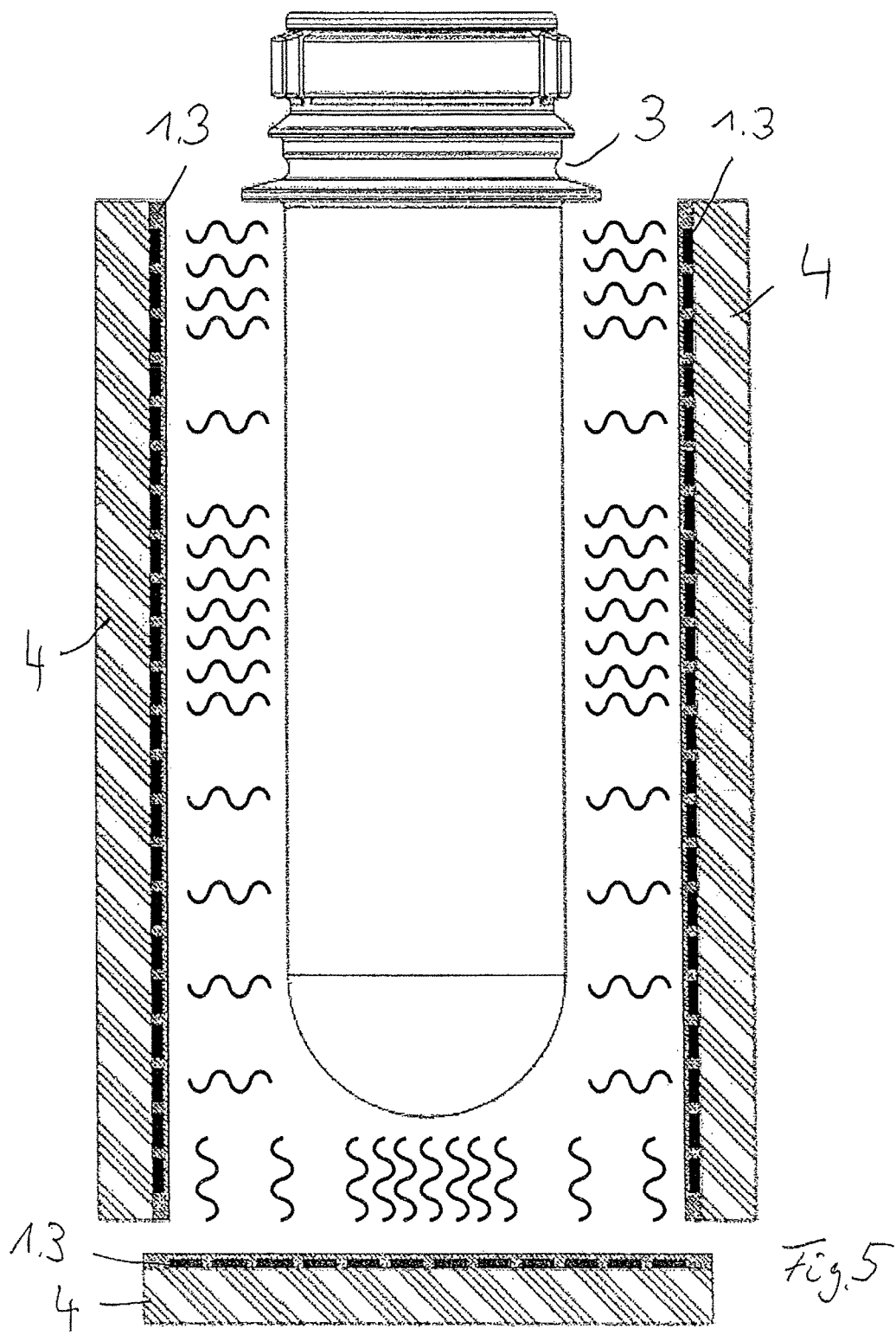
Figure 6:
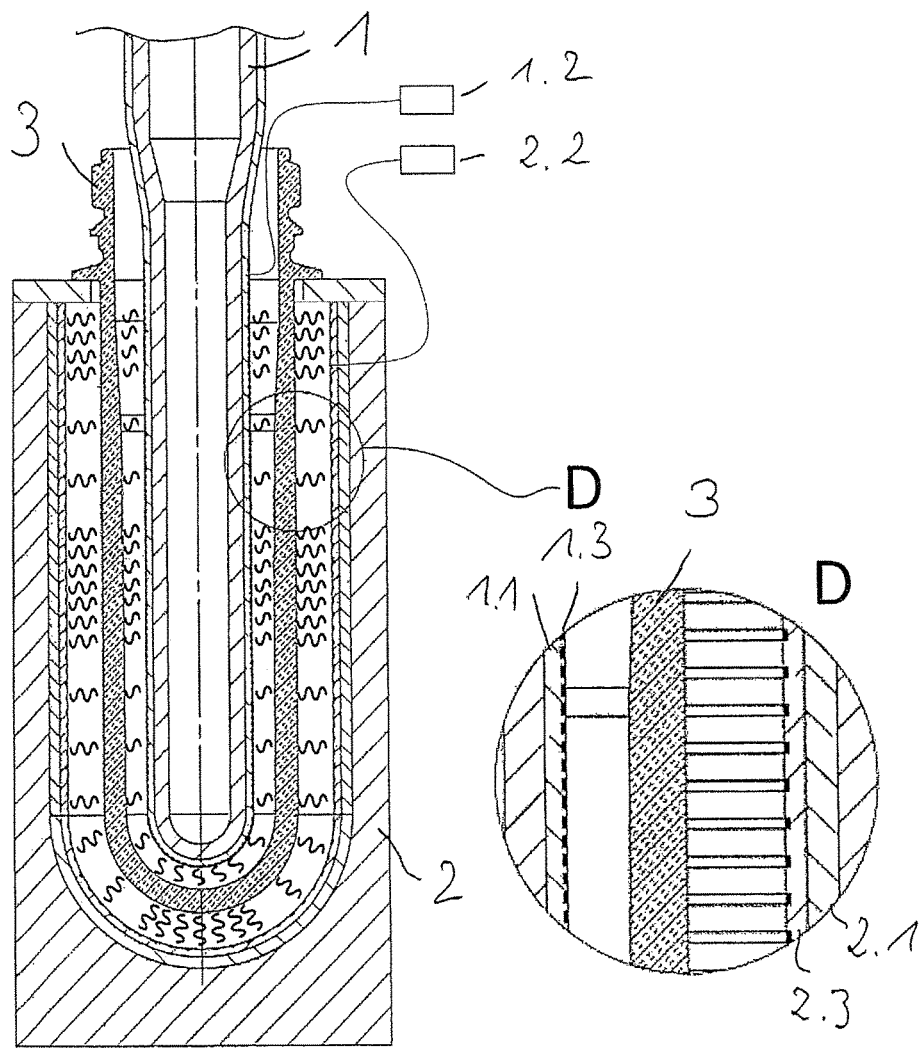
Figure 8:
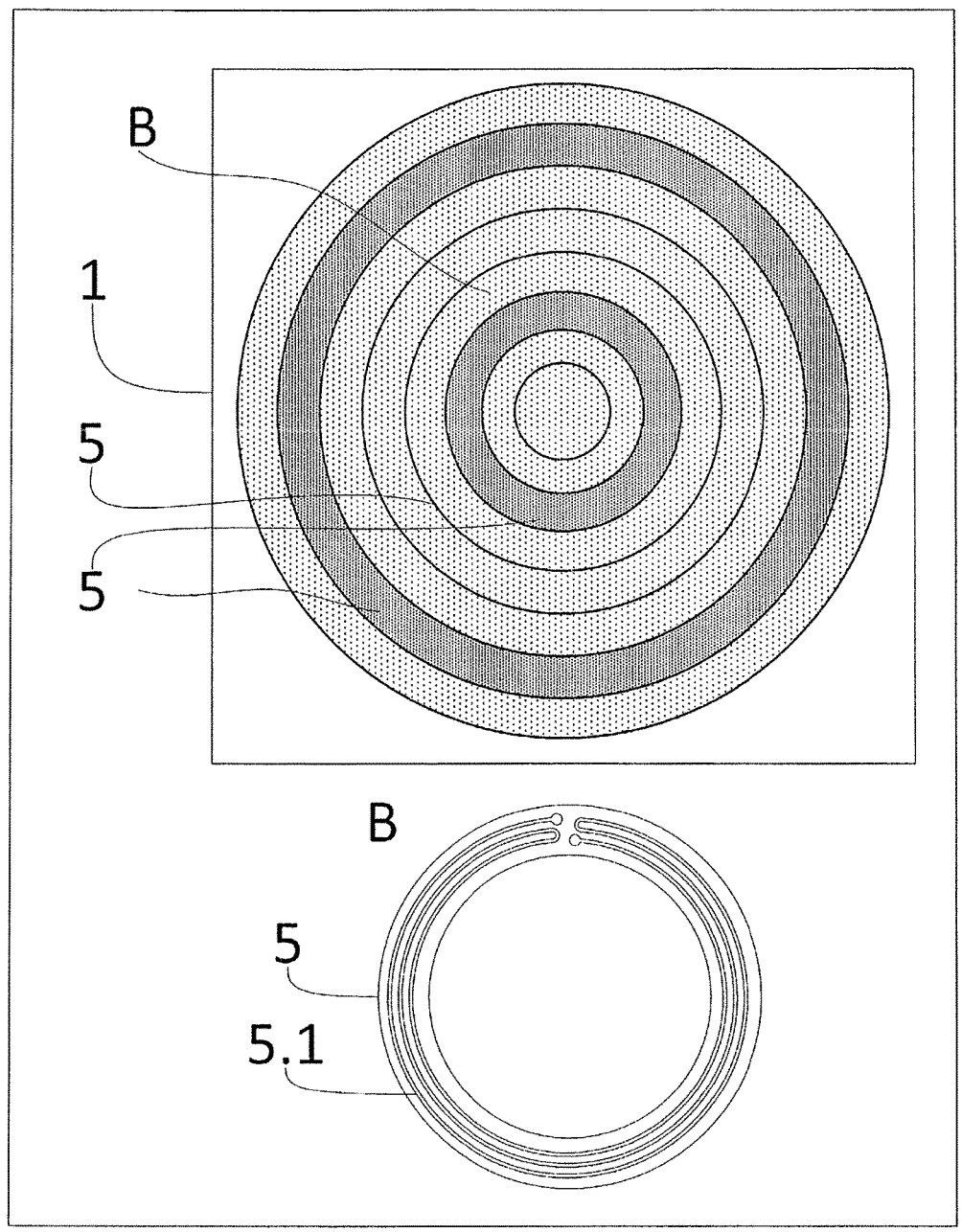
Figure 9:
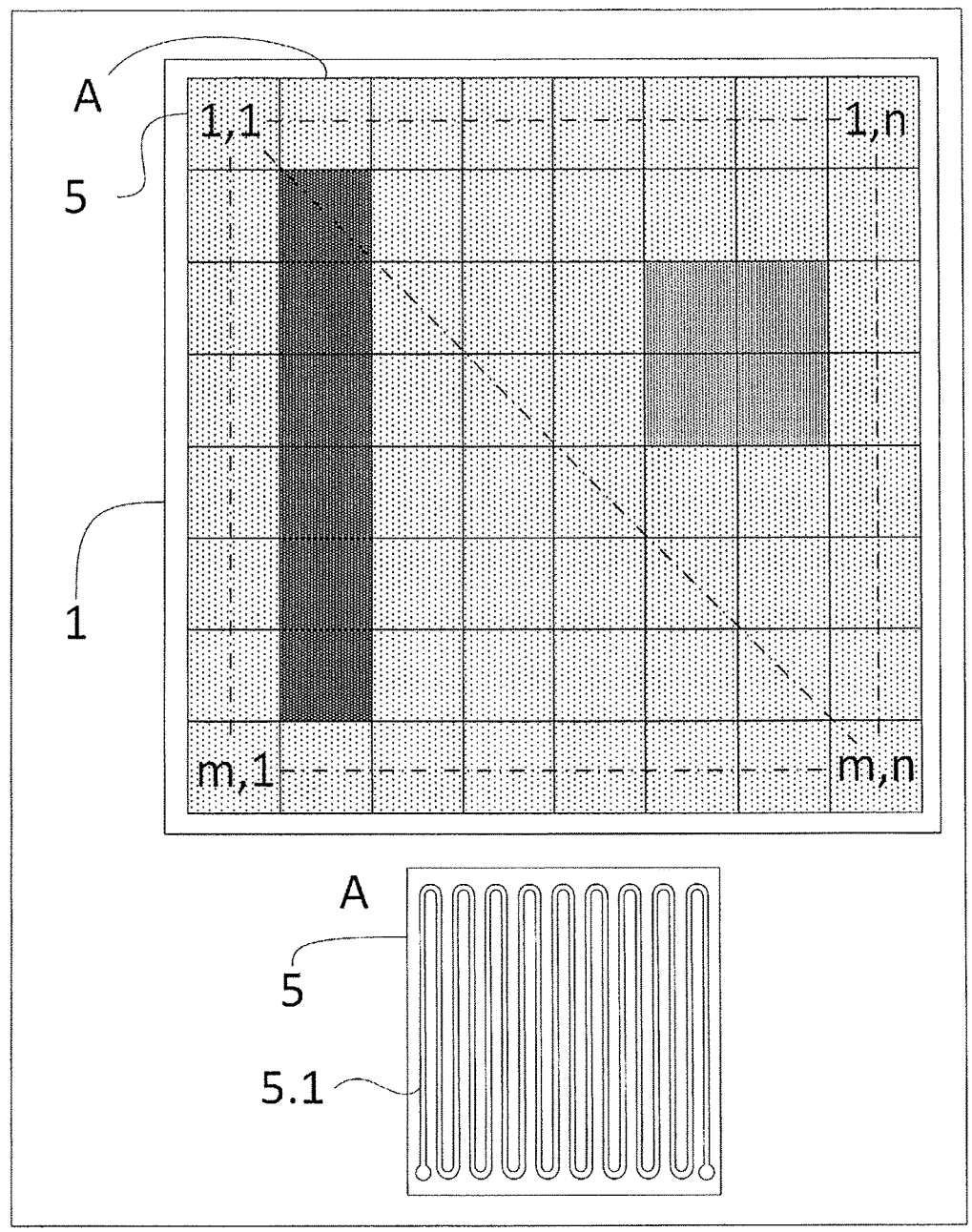

FIG. 4: a plurality of sectional representations of an application example "stretch blow molding process" with a stretching rod;

FIG. 5: a schematic sectional representation of an example in which a contactless transfer of a temperature profile to outer surface regions of a preform body can be reached;

FIG. 6: a schematic sectional representation of an example in which a contactless transfer of a temperature profile to outer and inner surface regions of a preform body can be reached;

FIG. 7: a sectional representation through a body which can be used in the invention;

FIG. 8: a plan view of an example of a body with circular heating resistors and of an individual circular heating resistor; and FIG. 9: a plan view of a body with heating resistors which are arranged in a row and column arrangement (array arrangement) as well as an individual heating resistor with a meandering electrical conductor track.

FIG. 1 shows a sectional representation of the apparatus in accordance with the invention for heating a preform body 3 in which the preform body 3 is held between two coaxially arranged bodies 1.0 and 2.0. As is shown by the Figure detail A, the body 1.0 has a first layer 1.1 and a contact layer 1.3. A first layer 2.1 and a contact layer 2.3 are likewise formed on the surface of the oppositely disposed body 2.0. A respective electrical heating resistor in the form of a conductor loop arranged in an areal geometrical manner is formed in each of the two first layers 1.1 and 2.1 of the bodies 1.0 and 2.0. Both bodies 1.0 and 2.0 furthermore have contact elements (not shown) via which the heating resistors are each connected to a power source 1.2 and 2.2 independently of one another. On the application of an electrical current, which can be regulated, to the heating resistors of the bodies 1.0 and 2.0, respective defined temperature profiles can be generated as a result of the respective geometrically arranged conductor loops which can be transferred at least primarily by thermal conduction to the preform body 3 in each case via the outer contact layer 1.3 and 2.3 formed on the first layer 1.2 and 2.1 by the contact with the surface of the preform body 3.

In the present example, the preform is a preform of a PET (polyethylene terephthalate) bottle, wherein the preform to be formed is completely surrounded by the body 1.0 designed as an arbor and by the body 2.0 designed as a bushing. The heating-up rates which can be achieved in this respect allow a pulse operation which can be controlled via the power sources 1.2 and 2.2. Energy can thereby be saved during transfer cycles or idle cycles.

The respective first layers 1.1 and 1.2 as well as the contact layers 1.3 and 2.3 are formed from thermally conductive polymeric materials which compensate a contact pressure onto the surface of the preform body 3. The conductor loops of the heating resistors are in this respect each arranged or embedded in a planar meandering manner in the layers 1.1 and 2.1.

FIG. 2 shows a further embodiment of the apparatus in accordance with the invention, wherein only a body 1.0 formed as an arbor is used for the transfer of a temperature profile to the inner surface of a preform body 3. In this embodiment, a direct combination with a further heating source 4 for the hybrid heating up of the preform body 3 is provided. The further heating source 4 in the present case is configured as an infrared radiator with whose radiant energy the outer surface of the preform can be heated.

FIG. 3 shows a detail of the layer 1.1 in which a plurality of conductor loops of a plurality of heating resistors are arranged in a geometrical planar manner. Each of the three conductor loops shown is connected separately via contact elements (not shown) to an electric power source (not shown) by which the conductor loops can be supplied with electric power independently of one another. In the present example, the conductor loops are formed in a planar wavy manner. Further planar geometrical structures, for example spiral geometrical structures, of the conductor loops are, however, also conceivable, wherein the planar structures can be arranged distributed regularly or irregularly in a planar manner.

An embodiment is shown by FIG. 4 in which the body 1.0 is configured as a stretching bar which is used in the stretching blow molding process. As the image detail C illustrates, the stretching bar 1.0 in accordance with the invention is configured with a first layer 1.1 and a contact layer 1.3, wherein the first layer 1.1 has a heating resistor whose conductor loop is wound spirally around the stretching bar 1.0. In the present example, the windings of the conductor loop around the stretching bar 1.0 are concentrated in the head region of the stretching bar 1.0. The heating resistor is connected via contact elements (not shown) at the stretching bar 1.0 to a power source 1.2 which can be regulated. The stretching bar 1.0 is moved in the direction of an arrow by a feed which can be regulated, wherein the perform body 3 is stretched in the direction of the arrow until a feed end position is reached. Since the temperature profile is formed in the head region of the stretching bar 1.0, the preform properties can be kept constant during the feed, i.e. during the stretching of the perform body 3. It is furthermore possible to temperature adjust the stretching bar 1.0, in contrast to the heating bars today usually heated by means of fluid, only locally and inhomogeneously, Embodiments are, however, also conceivable in which the body 1.0 and/or 2.0 include a further second layer which is formed between the respective first layer 1.1 and 2.1 and the respective contact layer 1.3 and 2.3 and in which passages and ports for the conducting of coolant are formed. The body can equally itself have passages for conducting fluids.

The use of the apparatus in accordance with the invention in this respect is not limited to the stretch blow molding process, but is rather suitable for drawing/stretching devices in general, e.g., also for the mechanical pre-stretching by stamps in thermoform processes.

In a further advantageous embodiment, the apparatus in accordance with the invention can also be used as a temperature adjustment system in the combined injection molding/stretch blow molding process. First and second bodies, i.e. the arbor and bushing, can in this respect be configured such that together they serve as a complete casting mold or individually as a component of a casting mold. The multilayer composite composed of the at least one first layer and the contact layer can thus only be partially formed on the surface of a cavity of a body. The named embodiments can thus be used in the combined injection molding/stretch blow molding process. In this respect, a plastic melt is first injected directly onto the contact layer which is heated in a defined differential manner, wherein the geometrical shape of the contact layer serves as the injection mold. Since the multilayer composite of at least the first layer and the contact layer only has a small thermal mass, less energy also has to be led off for cooling the mold mass (plastic mass) so that a fast and defined cooling of the form mass can be achieved using such cooling systems as described above (fluid cooling in the body or Peltier elements) or cooling layers (as a component of the multilayer composite). This embodiment of the apparatus in accordance with the invention thus allows an advantageous implementation of the cooling, which is controlled in a temporally specific manner, for the setting of specific properties of the preform.

The temperature adjustment of the preform in accordance with the process parameters and the predefined temperature profile can take place down-stream of the cooling process. The temperature adjusted preform can subsequently be transferred into a stretch blow mold and molded by the bushing designed in multiple parts.

The arbor can in this respect in addition to serving the heat input from the inner side of the preform advantageously also serve as a stretching bar in the stretch blow molding process. A local temperature adjustment can also be carried out during the stretching process by the surface which can also be temperature adjusted. If the multilayer composite is produced from porous, air-permeable material, the compressed air required for the molding can additionally be introduced into the inner space of the preform.

In the example shown in FIG. 5, a preform body 3 can be moved translatorily between two elements 4 arranged in parallel with one another. In this respect, the direction of movement extends into the plane of the drawing or opposite thereto. A further element 4 is arranged at the lower side. The elements 4 are provided with contact layers 1.3. As shown by the wavy lines, the contact layers 1.3 are controlled in a locally differentiated manner so that locally different electric energy is present for a heating by convection or thermal radiation. A higher temperature can be reached at the preform body 3 in regions in which the wavy lines are arranged more closely together than in regions in which the spacings of the wavy lines are larger. In this example, a desired temperature profile can therefore be transferred by contactless heating at the preform body. The heating in this respect takes place from the outer surface.

On the translatory movement, a rotation of the preform body 3 can additionally be carried out which takes place about its middle longitudinal axis which is aligned in parallel with the two elements 4 arranged opposite one another.

In the example shown in FIG. 6, the heating and the transfer of a desired favorable temperature profile to a preform body 3 does not only take place from its outer surface. An arbor is additionally present as a body 1 which can be guided through an opening into the interior of the preform body 3. In this example the heating also takes place by transfer of a desired temperature profile by convection and/or thermal radiation which emanates from contact layers 1.3 and 2.3. The locally differentiated heating of the preform body 3 is also illustrated by wavy lines here.

Otherwise, the same elements are characterized by the same reference numerals as in the other Figures.

FIG. 7 shows a sectional representation of a body 1.0 formed with multiple layers. In this respect, a plurality of heating resistors 5 are formed directly beneath a contact layer 1.1 which is non-stick and flexible to improve contact. If radiation or convection should be used, the contact layer 1.1 should have an adapted emission coefficient.

The heating resistors 5 are electrical conductor tracks which have been formed from silver by printing a paste containing silver onto a ceramic substrate, for example a board of LTCC or HTCC ceramic material. The electrically conductive connection of the heating resistors 5 and of further elements 6 requiring an electrical connection such as temperature sensors or Peltier elements can be established by means of vias 5.2, 5.3 known per se. Further heating resistors can also be present in further levels in a form not shown which can then preferably be arranged offset from the shown heating resistors 5 which are arranged directly beneath the contact layer 1.1.

Temperature sensors 6 are arranged in a plane beneath the heating resistors 5 in this example. A continuous reflective layer or barrier layer 7, which can be formed from metal and can increase the efficiency, is here arranged in a plane thereunder.

Underneath it in turn is a layer 8 for cooling through which a cooling medium, e.g. air or water, can be led through passages 9.1, or Peltier elements 9.2 can be arranged there.

In this example, a porous layer 10 adjoins this for the thermal decoupling and optionally for the implementation of a gas permeability to be able to utilize pressure differences.

FIG. 8 shows by way of example a possibility for forming a body 1 in a plan view with circular heating resistors 5 and a central circular heating resistor 5. As shown in the lower representation, the heating resistors 5 are formed with electrical conductor tracks 5.1 from silver having a width of 0.02 mm and a thickness of 10 µm. They can each be individually controlled so that they can have electrical voltage applied offset in time from one another for a locally differentiated heating, which is indicated by the different shades in the drawing. A plurality of heating resistors 5can, however, also have electrical voltage applied simultaneously, wherein, however, different energies being used at individual heating resistors 5. It is possible in this respect to control a plurality of heating resistors 5 differently using a common regulator.

FIG. 9 shows an example of a body 1 in a plan view in which a plurality of heating resistors 5 are present in a row and column arrangement with n rows and m columns. These heating resistors 5 can also each be controlled individually as in the example of FIG. 8 and in accordance with the general part of the description. They are each individually contacted. In this example, the individual heating resistors 5 are formed by electrical conductor tracks 5.1 of meandering form.

It can generally be stated that heating resistors 5 arranged next to one another can be operated at one or at least in its proximity in dependence on the locally desired temperature and on the instantaneous temperature. Thermal conduction can also be used for heating by a temporally offset activation of adjacent heating resistors 5 and the required total energy can thereby be reduced.

The invention claimed is:

1. An apparatus for heating preform bodies from thermoplastic material for use in blow forming, said apparatus comprising:
at least one heat-supplying body (1.0, 2.0) having a surface that geometrically corresponds to an outer or inner contour of a preform body, said surface forming at least one first layer or coating (1.1, 2.1) and including a plurality of electrical heating resistors (5), each of said heating resistors in the form of a conductor loop arranged in a planar geometrical manner, each of said heating resistors individually controllable, each of said heating resistors having a temperature-dependent resistance, a thickness in the range of 1-10 µm and a width in the range of 0.001-5 mm, wherein
said body (1.0, 2.0) includes contact elements and electrically conductive connections by means of vias in the at least one first layer or coating (1.1, 2.1) through which said heating resistors (5) are individually connected to a power source (1.2, 2.2) and a regulator, wherein the regulator is configured to determine the electrical resistance of the heating resistors, to derive temperatures based on the determined electrical resistances and the temperature-dependent resistances, and to individually control electrical power supplied to each one of said heating resistors based on the derived temperatures and a defined temperature profile, and wherein the geometrical arrangement of said heating resistors and the electrical power supplied to each one of said heating resistors are configured to generate the defined temperature profile; and
an outer contact layer (1.3, 2.3) formed on the first layer or coating (1.1, 2.1) and configured to transfer the generated defined temperature profile to the preform body by contacting and transferring heat to the surface of the outer or inner contour of the preform body.

2. An apparatus in accordance with claim 1, characterized in that at least one of said electrical heating resistors is formed from a doped ceramic material or polymeric material or is formed by an electrically conductive metal layer or oxide layer which is applied/incorporated on or in an electrically insulating carrier layer and is electrically insulated on the side facing the body (1.0, 2.0).

3. An apparatus in accordance with claim 1, characterized in that the conductor loop of the electrical heating resistor(s) (5) is/are formed as meandering or spiral.

4. An apparatus in accordance with claim 1, characterized in that the conductor loop of the electrical heating resistor(s) (5) are directly printed on the surface of the body (1.0, 2.0).

5. An apparatus in accordance with claim 1, characterized in that the outer contact layer is formed from a glass material, ceramic material or polymeric material.

6. An apparatus in accordance with claim 1, characterized in that the body (1.0, 2.0) has a further second layer which is formed between the first layer (1.1, 2.1) and the contact layer (1.3, 2.3) and in which passages and ports for conducting a fluid are formed.

7. An apparatus in accordance with claim 1, characterized in that the body (1.0, 2.0) and all the layers or coatings applied to or formed on it have a porosity which allows air flow to circulate from or into the body.

8. An apparatus in accordance with claim 1, characterized in that the apparatus has a further heat-supplying body (2.0), wherein the further body (2.0) has a surface that geometrically corresponds to the outer or inner contour of the preform body.

9. An apparatus in accordance with claim 1, characterized in that said body is formed from a low or high temperature cofired ceramic material.

10. An apparatus in accordance with claim 1, characterized in that said body is formed from a plurality of mutually connectable individual modules and at least one heating resistor (5) is present on each of the individual modules.

* * * * *